United States Patent [19]

Simin

[11] Patent Number: 4,725,031
[45] Date of Patent: Feb. 16, 1988

[54] BAR LINKAGE SEAT ADJUSTER APPARATUS AND METHOD

[75] Inventor: Gerald L. Simin, Holly, Mich.

[73] Assignee: General Motors Corp., Detroit, Mich.

[21] Appl. No.: 943,700

[22] Filed: Dec. 18, 1986

[51] Int. Cl.⁴ .............................................. F16M 13/00
[52] U.S. Cl. .................................. 248/425; 248/281.1; 248/421; 296/65 R; 297/344; 297/349
[58] Field of Search ............ 248/425, 424, 430, 281.1, 248/421; 296/65 R; 297/344, 346, 349, 337; 108/137, 139, 140

[56] References Cited

U.S. PATENT DOCUMENTS

| | | | |
|---|---|---|---|
| 1,987,431 | 1/1935 | Browne | 248/430 |
| 2,256,009 | 9/1941 | Atwood | 248/424 |
| 2,391,872 | 1/1946 | Berg | 248/281.1 X |
| 3,572,817 | 3/1971 | Colautti et al. | 296/65 R |
| 3,659,895 | 5/1972 | Dresden | 296/65 R |
| 3,860,283 | 1/1975 | Colautti | 296/65 R |
| 4,026,379 | 5/1977 | Dunn et al. | 296/65 R X |

Primary Examiner—J. Franklin Foss
Assistant Examiner—David L. Talbott
Attorney, Agent, or Firm—Ernest E. Helms

[57] ABSTRACT

The present invention provides a four bar linkage seat adjuster apparatus and method of utilization of the same. The seat adjuster includes two links pivotally and cantileveredly connected with the vehicle. A third link is pivotally connected with the first two links and is also connected with the seat. The third link has a latch which selectively sets the position of the third link with respect to the first link thereby determining the position of the seat within the vehicle.

1 Claim, 5 Drawing Figures

BAR LINKAGE SEAT ADJUSTER APPARATUS AND METHOD

FIELD OF THE INVENTION

The field of the present invention is that of vehicle seat adjusters. More particularly, the field of the present invention is that of vehicle seat adjusters adjustable in a generally horizontal plane in the fore and aft directions.

DISCLOSURE STATEMENT

It is well known in the art to have vehicle seats which are adjustable fore and aft within a vehicle. The typical seat adjuster has two fore and aft oriented parallel floor channels fixably connected to the vehicle floor. Two parallel seat channels are fixably connected to the seat and are slidably mounted to the respective floor channels. An adjuster latch fixably connected with the seat or seat channel is provided to set the position of the seal channel with respect to the floor channels. Since the adjuster latch is usually fixed with respect to the seat channel, the length of the adjustable seating positions of the seat is limited by the maximum length of the floor channel. The length of adjustable seating positions is further limited to prevent exposure of the floor channel from the front seat occupant when the seat is adjusted to its rearmost position. In like manner adjustment length is further limited to prevent exposure of the floor channel to a rear seat occupant when the seat is adjusted to its extreme forward position. Therefore, maximum front seat fore and aft adjustment is usually in the range of four to seven inches (10 to 18 cm) in vehicles with front and rear seating areas. It is desirable to provide a vehicle seat with increased fore and aft adjustment.

To reduce vehicle aerodynamic drag, many automotive vehicle manufacturers have lowered the contour of the vehicle roof. Therefore, for proper circulation of air within the vehicle, it is desirable to increase the airflow underneath the front seating area.

SUMMARY OF THE INVENTION

To meet the above-noted and other desires, the present invention is brought forth. The present invention in its preferred embodiment provides a seat adjuster with first and second links cantileveredly pivotally connected with the vehicle. A third link is generally transverse with the first and second links and is pivotally connected with both. The vehicle seat is fixably or pivotally connected with the third link. Means are provided to selectively adjust the position of the third link with respect to the fist link. By setting the position of the first link with respect to the third link, the seat may be placed into a plurality of seating positions with respect to the vehicle. The maximum displacement between the fore and aft positions of the vehicle seat within the vehicle may now be increased to a range approximately of 10 inches (25 cm) without exposure of the seat adjuster components to the vehicle front or rear seat occupants. Even in one embodiment of the present invention which utilizes a pedestal to partially support the third link, all of the links of the seat adjuster are protected from exposure and the area underneath the seat provides a greater area for air circulation currents within the vehicle.

It is an object of the present invention to provide an apparatus and method of utilization of the same of a vehicle seat adjuster providing increased fore and aft travel. It is also another object of the present invention to provide an apparatus and method of utilization of the same of a vehicle seat adjuster allowing a more open area for circulation of air underneath the seat.

It is another object of the present invention to provide a vehicle seat adjuster, including first and second links cantileveredly pivotally connected with the vehicle, a plate with a plurality of notches pivotally connected with the seat and pivotally connected to and generally transverse with the first and second links, a pedestal connected with the vehicle partially supporting the plate, a first latch connected with the first link and having a connected pawl to engage with one of the plate notches to adjustably fix the position of the plate with respect to the first link whereby the seat can be placed in a plurality of generally tandem seating positions with respect to the vehicle, and a second latch to adjustably fix the position of the seat with respect to the plate whereby the seat may be placed in a plurality of angular positions with respect to the plate.

It is yet another object of the present invention to provide a method of adjusting the position of a vehicle seat utilizing a seat adjuster, including pivotally and cantileveredly connecting first and second links with the vehicle, pivotally connecting generally transverse with the first and second links a third link connected with the seat, and adjustably fixing the position of the third link with respect to the first link whereby the seat can be placed in a plurality of seating positions with respect to the said vehicle.

Other objects, desires, and advantages of the present invention will become more apparent to those skilled in the art as the nature of the invention is better understood from the accompanying drawings and a detailed description.

DETAILED DESCRIPTION OF THE DRAWINGS

Figure 1:
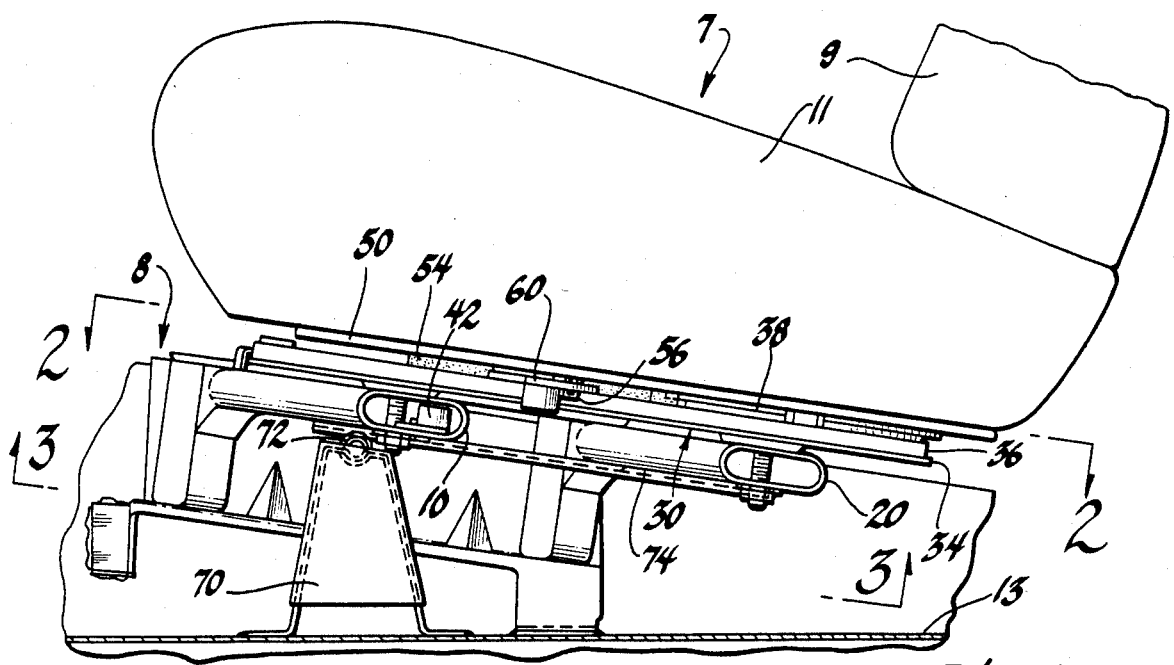
FIG. 1 is a side elevational view of a seat installed within a vehicle utilizing a preferred embodiment seat adjuster of the present invention.
Figure 2:
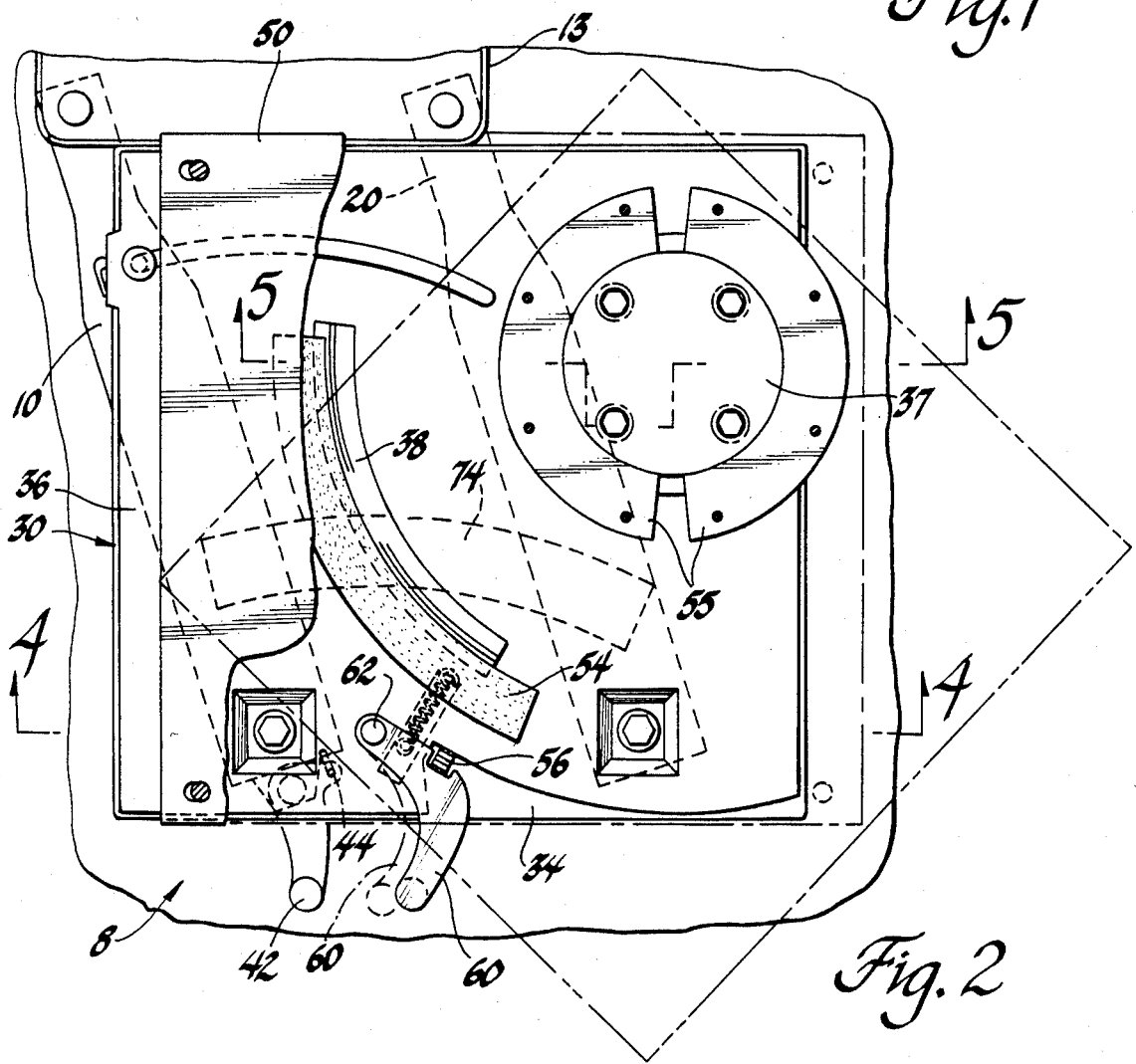
FIG. 2 is a view taken along line 2—2 of FIG. 1.

Referring to FIG. 1, the vehicle seat 7 utilized with the present inventive seat adjuster 8 has generally vertical seat back 9 joined with a generally horizontal seat cushion 11. Referring in addition to FIGS. 2, 3, 4 and 5, seat adjuster 8 has four major components. The first and second components are the generally straight first forward and second rearward links 10 and 20. Link 10 and link 20 are both pivotally joined to the vehicle floorboard 13 and support the seat 7. Link 10 and link 20 are also horizontally projecting from and cantileveredly supported from the vehicle floorboard 13, along the center hump. A third component, third link 30 (hereinafter referred to as lower plate 30) is pivotally connected with both link 10 and link 20. The lower plate 30 is generally transverse with the first link 10 and the second link 20. The seat 7 is connected with the lower plate 30 and in the embodiment illustrated may be angularly displaced with respect to the lower plate 30. The fourth major component of the seat adjuster is the means to adjustably fix the position of the third link with respect to the first link provided by first latch 42.

Hand-controlled first latch 42 is pivotally mounted to first link 10 generally opposite the center hump. First latch 42 is connected with a rod 44 which passes through the interior of the link 10. Via the rod 44, first latch 42 is also connected with a generally horizontal pawl 46 which can engage with one of a series of notches 32 provided by the lower plate 30 generally adjacent to the center hump.

Lower plate 30 for added strength, is fabricated from two pieces 34, 36 of sheet metal (FIG. 4) fixably connected together. On top of the lower plate 30 is a plastic guide 54. Seat attacment plate 50 (generally aligned with lower plate 30) is fixably connected with seat cushion 11 and is with to lower plate 30 to allow the seat 7 to be angularly eccentrically pivotally connected displaced into a plurality of positions. The pivotal connection of seat attachment plate 50 with lower plate 30 is generally adjacent to link 20 and to the center hump. Seat attachment plate 50 is fixably connected with guide 54. Curved rail 38, fixably connected with lower plate 30 captures guide 54 to provide alignment during the adjustment of seat 7 with respect to lower plate 30. Seat attachment plate 50 has boltably attached thereto plates 55 and 57 (FIG. 5) which cooperate to capture turn plate 37 (fixably attached with lower plate 30) and second plastic guide piece 39.

Means are provided to adjustably fix the position of the seat 7 with respect to lower plate 30 by a second latch 60. Second latch 60 is pivotally attached at point 62 with lower plate 30. Fixably connected to seat attachment plate 50 is loop 56. Movement of second latch 60 releases loop 56, allowing the seat attachment plate 50 to pivot the respect to the lower plate 30. The above allows the vehicle seat 7 to be tilted outward (phantom position FIG. 2) providing for easier entry to or exit from the vehicle.

In some applications, links 10 and 20 will not be sufficient to support all the weight of the vehicle seat 7 and occupant. In such applications, a pedestal 70 is provided to partially support the lower plate 30. the pedestal 70, connected with the vehicle, is mounted underneath the lower plate 30 and typically will have a ball bearing 72 riding within a wear track 74 provided underneath and attached with the lower plate 30.

The seat 7 is adjustable fore and aft in a given plane, however that plane will usually be slightly inclined so that vehicle seat occupant will be raised towards the steering wheel as he or she adjusts the seat 7 forward. To bias the seat to a predetermined forward position, a spring 90 (shown only in FIG. 3) is connected between the link 20 and vehicle floor 13. It is apparent to those skilled in the art that the spring 90 could easily be replaced by a torsional spring acting upon the link 10 or link 20 along their pivotal connection with the vehicle floor 13.

Figure 3:
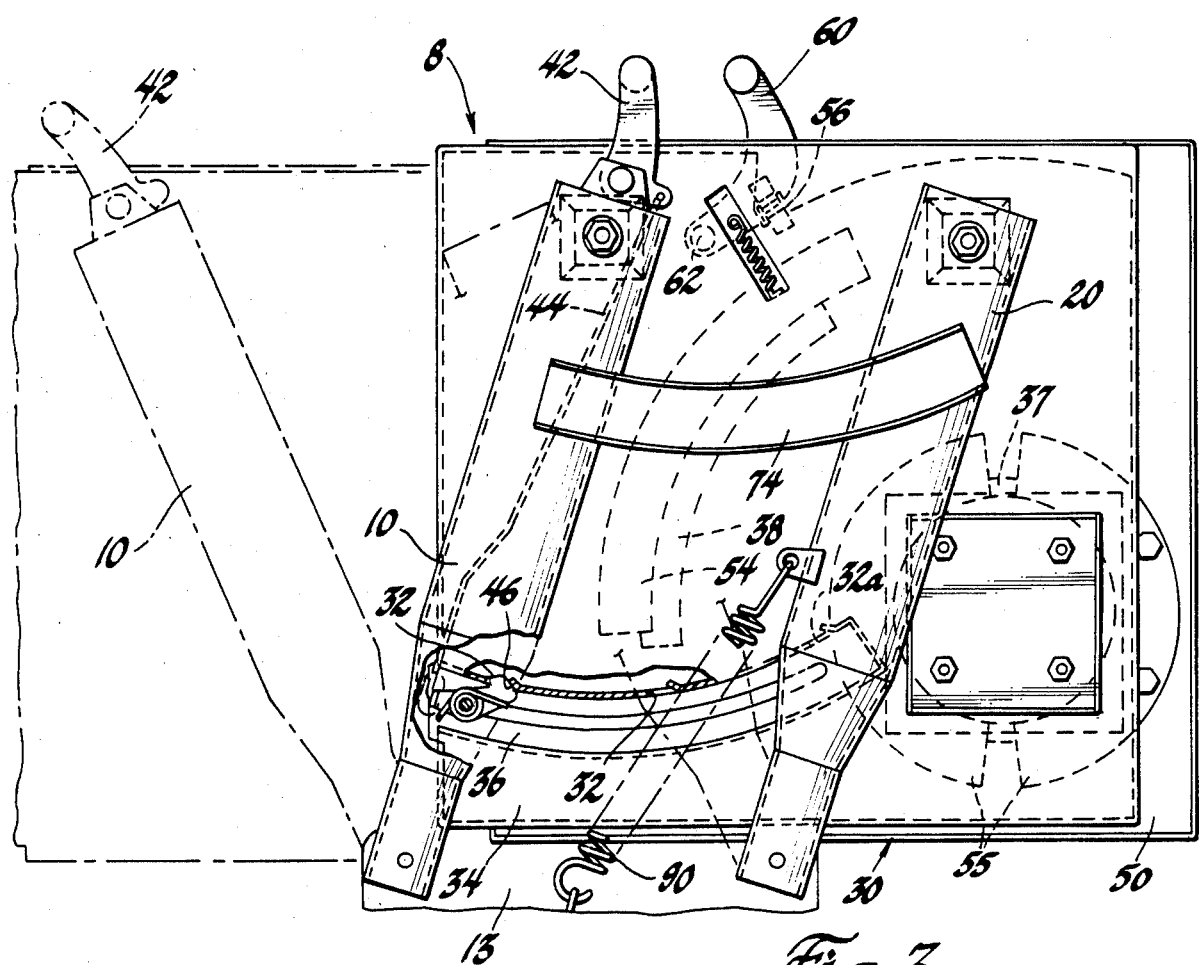
FIG. 3 is an view taken along line 3—3 of FIG. 1.
Figure 4:
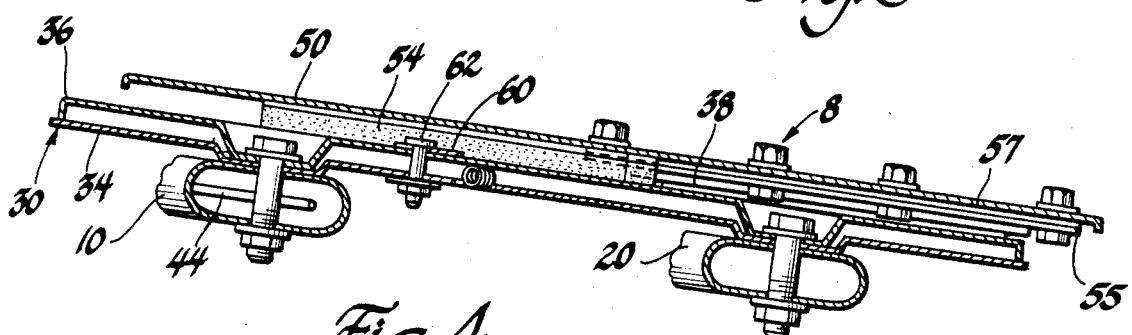
FIG. 4 is a view taken along line 4—4 of FIG. 2.
Figure 5:
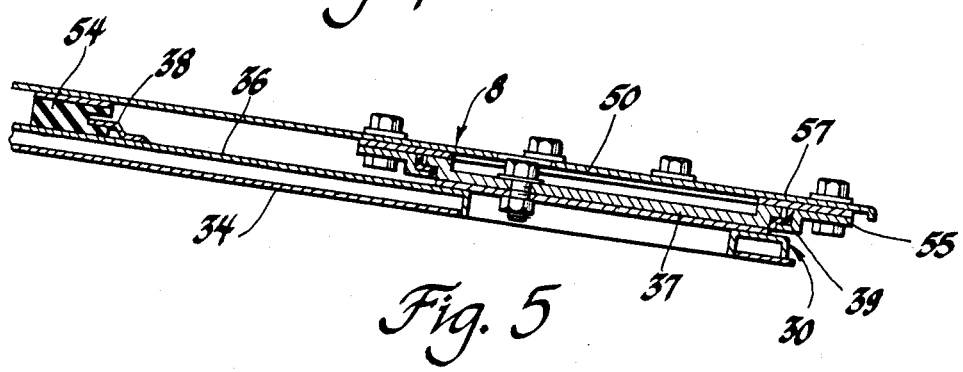
FIG. 5 is a view taken along line 5—5 of FIG. 2.

In operation the vehicle seat will be initially biased to the extreme forward position (phantom FIG. 3). A pull on latch 42 removing the pawl 46 from the notch 32a in lower plate 30. Since the adjuster 8 works in a manner similar to a parallel four bar linkage, the vehicle seat 7 can now be adjusted rearward into a plurality of positions which are generally tandem to one another. There is a slight radial movement of the seat with respect to the vehicle floor hump but this amount is typically in the insignificant range of approximately of a quarter of an inch (0.6 cm). At all times, no portion of the seat adjuster 8 is exposed to the front or rear vehicle seat occupants. Since the floor or seat channels underneath the seat have been eliminated, there is a greater area underneath seat 7 for the circumlation of air. Greater circulatory area is particularly important in automotive vehicles which only have ventilation vents along or underneath the front dashboard.

To leave the vehicle, the second latch 60 is pulled out and the seat occupant may simply by their own movement cause the seat 7 to tilt outward towards the door making egress and ingress to the vehicle easier.

The present invention provides a method of utilizing a seat adjuster 8 to adjust the position of a vehicle seat 7 including the following steps:

1. Pivotally and cantileveredly connecting first 10 and second 20 links with the vehicle 13.
2. Pivotally connecting generally transverse with the first 10 and second 20 links a third link 30 connected with the seat 7.
3. Adjustably fixing the position of the third link 30 with respect to the first 10 link whereby the seat 7 can be placed in a plurality of seating positions with respect to said vehicle 13.

While an embodiment of the present invention has been explained, it will be really apparent to those skilled in the art of the various modifications which can be made to the present invention without departing from the spirit and scope of this application as it is encompassed by the following claims.

The embodiments of the invention in which an exclusive property or priviledge is claimed are defined as follows:

1. A vehicle seat adjuster for a vehicle with a central hump, said adjuster in combination comprising:
    generally straight first forward and second rearward links horizontally projecting from and cantileveredly pivotally connected with said vehicle along said central hump for supporting said seat, said first and second links being biased to a first position;
    an inclined horizontal lower plate with a plurality of notches generally adjacent said central hump pivotally connected to and generally transverse with said first and second links;
    a seat attachment plate generally aligned with said lower plate eccentrically pivotally connected with said lower plate with a pivotal connection generally adjacent to said hump and said second link;
    a pedestal connected with said vehicle partially supporting said lower plate;
    a first latch connected with said first link generally opposite said hump and having a connected rod which is in turn connected with a generally horizontal pawl to engage with one of said plate notches to adjustably fix the position of said lower plate with respect to said first link whereby said seat can be plated in a plurality of generally tandem seating positions with respect to said vehicle; and
    a second latch pivotally attached to said lower plate to adjustably fix the position of said seat with respect to said plate whereby said seat may be placed in a plurality of angular positions with respect to said plate.

* * * * *